United States Patent [19]
Farfaletti-Casali

[11] 3,804,712
[45] Apr. 16, 1974

[54] THERMALLY INSULATED PANEL FOR A GAS COOLED NUCLEAR REACTOR

[75] Inventor: Flaviano Farfaletti-Casali, Milan, Italy

[73] Assignee: European Atomic Energy Community (Euratom) Luxemburg (Gfrand-Duchy) European Centre Kirchberg, Luxemburg, Luxembourg

[22] Filed: Oct. 19, 1970

[21] Appl. No.: 81,812

[30] Foreign Application Priority Data
Nov. 18, 1969 Luxembourg.......................... 59839

[52] U.S. Cl................................. 176/87, 165/135
[51] Int. Cl............................................ G21c 11/08
[58] Field of Search....................... 176/87; 165/135

[56] References Cited
UNITED STATES PATENTS

| | | | |
|---|---|---|---|
| 3,488,255 | 1/1970 | Hayden et al..................... | 176/87 X |
| 3,595,728 | 7/1971 | Robson............................. | 176/87 X |
| 3,403,807 | 10/1968 | Hawgood et al.................. | 176/87 X |
| 3,528,495 | 9/1970 | Armstrong et al................ | 176/87 X |

FOREIGN PATENTS OR APPLICATIONS

| | | | |
|---|---|---|---|
| 1,158,026 | 7/1969 | Great Britain....................... | 176/87 |
| 1,129,573 | 10/1968 | Great Britain....................... | 176/87 |
| 1,162,473 | 9/1968 | France................................. | 165/135 |

Primary Examiner—Reuben Epstein
Attorney, Agent, or Firm—Stevens, Davis, Miller & Mosher

[57] ABSTRACT

A thermal insulation panel for the interior of a vessel in a gas cooled reactor. A series of metal strips, spaced apart from one another, are bent in a zigzag shape to define between them a plurality of cells. Adjacent metal strips are connected to each other, preferably at places where the distance between the strip is minimal, by metal bridging members. The cells house thermal insulating material which has the same shape as the cells and which is constructed and interconnected with the metal strips to permit thermal expansion of the panel. In one embodiment the insulation includes a plurality of metal insulating sheets while in an alternative embodiment the insulation is made of a fibrous or porous material with a single metal insulating sheet to enclose such material. The metal insulation has one undulation along a diagonal and at least two undulations perpendicular to the one undulation to permit thermal expansion of the panel.

11 Claims, 4 Drawing Figures

VESSEL

THERMALLY INSULATED PANEL FOR A GAS COOLED NUCLEAR REACTOR

The invention relates to the thermal insulation of vessels for nuclear reactors.

One of the most serious problems involved in building vessels, particularly prestressed concrete vessels, for gas-cooled nuclear reactors is that of designing panels for thermally insulating the inside surface of the vessels, these panels being simultaneously economical, easy to assemble and capable of withstanding any depressurisation of the system without suffering excessive damage, and having good insulating properties. The problem is even more difficult in the case of high-temperature gas reactors, due to the high thermal expansion to which the panel structure may be subject.

The present invention, which seeks to provide at least a partial solution to these problems and to reduce the disadvantages of existing insulations, provides a panel for thermally insulating the interior of a vessel in a gas-cooled reactor, characterised in that it comprises a series of metal strips bent to define, between these strips, cells in which thermally insulating material is housed and fixed, the strips being mechanically attached to the vessel interior, and the strips and the thermally insulating material being constructed and interconnected to permit the thermal expansion to which the panel structure is subject.

According to a preferred feature of the invention, the series of metal strips are mechanically interconnected by metal bridging members, preferably at places where the distance between two strips is minimal, the bridging members containing holes for the passage of panel-fixing pins welded to the inside surface of the vessel.

According to a further preferred feature, the thermally insulating material is in the form of sheets superimposed on one another, having the same shape as the cell in which they are housed, and comprising one undulation along a diagonal and at least two undulations which are preferably perpendicular to the first undulation.

A specific embodiment of the invention and a variant thereof will now be described, by way of example, with reference to the accompanying drawings, in which.

Figure 1:
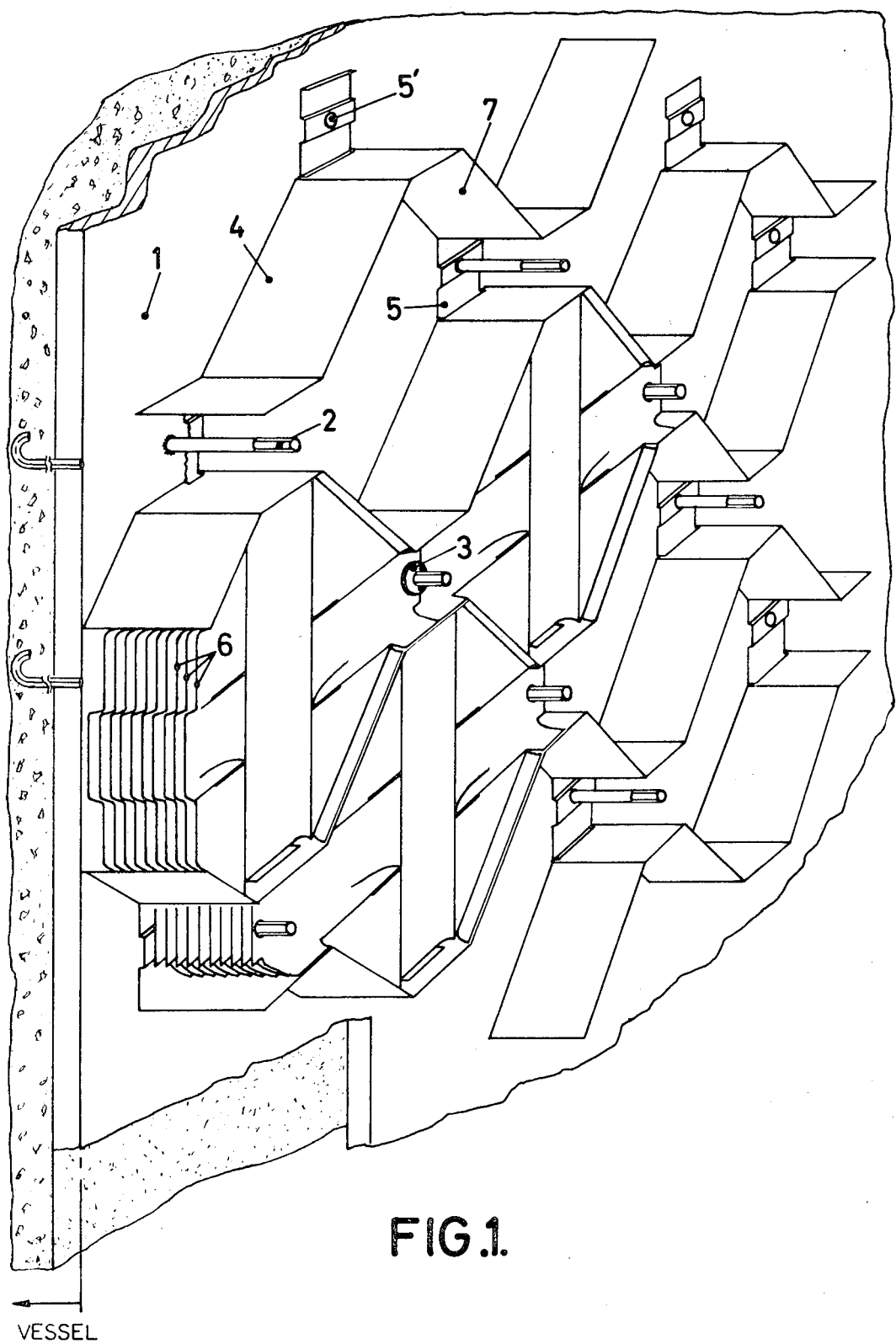
FIG. 1 illustrates a portion of a lined vessel.

FIG. 1 shows the fluid-tight liner 1 which forms the cold sealing liner of the concrete vessel. This liner is a thick, continuous welded sheet of metal which covers the flat bottom and cylindrical inside surface of the vessel. This surface, being curved, complicates mounting of the insulating panels. However, since the radius of curvature of the vessel interior is large (5 to 10 m), the cylindrical surface may be regarded, as a first approximation, as a flat area. The liner 1 is cooled by tubes which are buried in the concrete and through which water flows, so that its average temperature, and therefore the temperature of the concrete, does not exceed 50°C.

Pins 2 are provided to fix the insulating panels to the vessel liner. These pins are welded to the liner in a staggered arrangement, at intervals of 300 to 500 mm, and are ready to receive the insulating panels. These pins 2 are threaded at their free ends, and they are preferably tubes rather than solid round bars, in order to reduce the cross-sectional area of the hot spots where they join the liner.

To reduce subsequent heat losses, part of each pin may be made from refractory insulating material.

Figure 3:
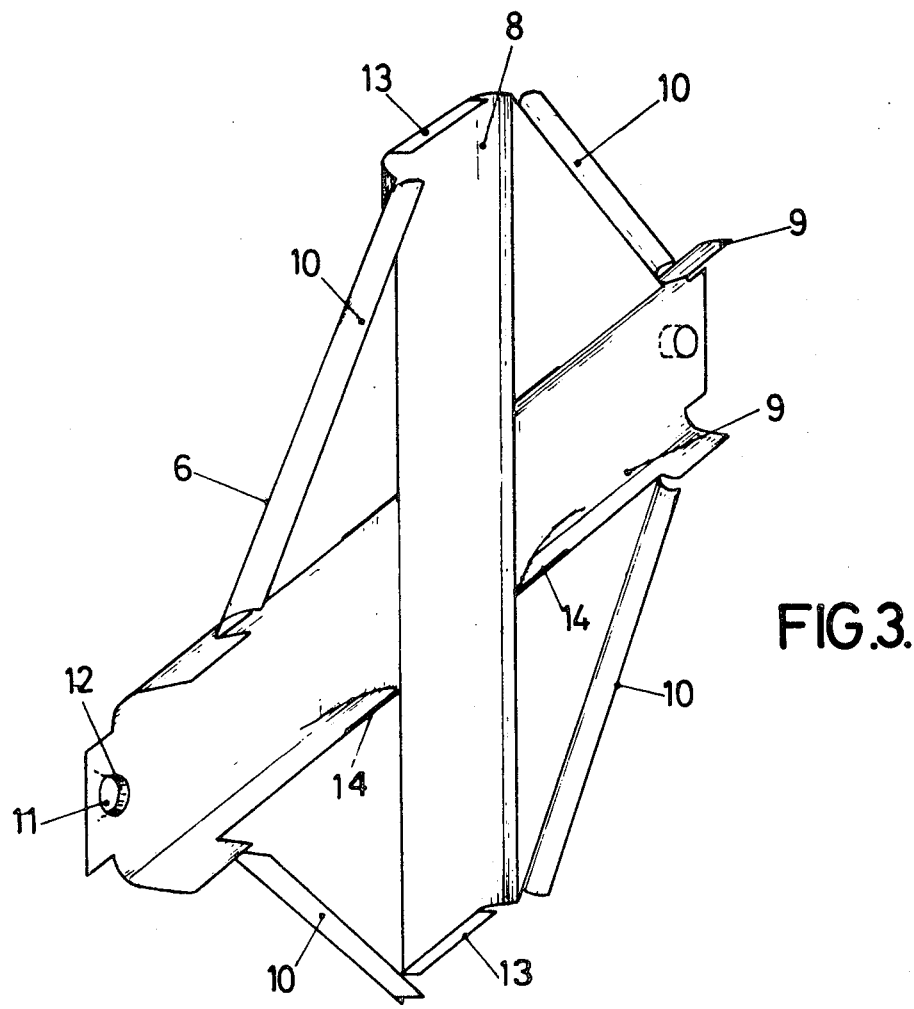
FIG. 3 shows the shape of the metal sheet used in the insulating cells.

Each of the insulating panels, whose metal structure is shown in FIG. 1, is formed of numerous insulating cells produced by superimposing on one another metal sheets shaped as shown in FIG. 3.

The operations of fixing the panels to the flat surface of the vessel bottom and to the cylindrical surface are very easy. The panels are merely threaded onto the pins 2 and fixed with nuts 3. To prevent the nuts from loosening, the thread may be deformed slightly by hammering or the nuts fixed with a weld point.

Figure 2:
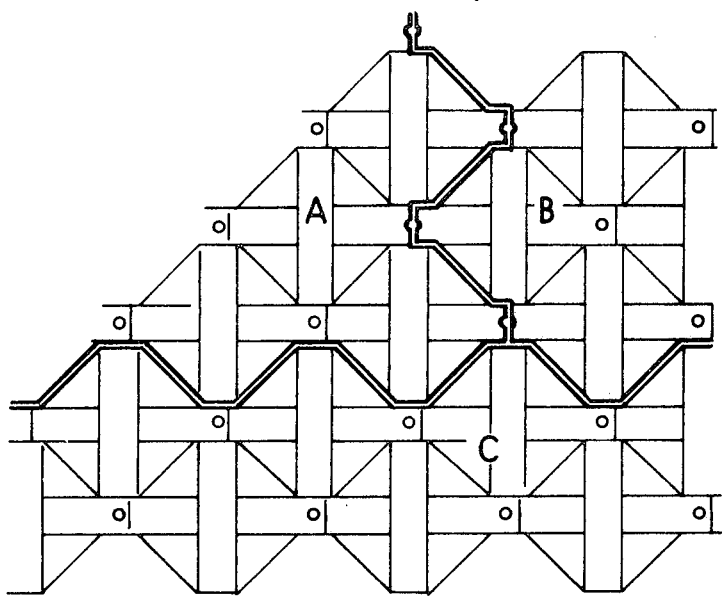
FIG. 2 shows the arrangement of the panels.

The dividing lines between the various panels may be as indicated in FIG. 2, where a double line marks the divisions between three panels A, B and C. The dividing lines zigzag along the separation lines between contiguous cells.

It should be noted that, since the thermal expansion in each cell is absorbed by that cell, no clearance need be left between the various panels during assembly, which is therefore easier. The panels may be in contact with one another when assembled, and the rims of the outer side walls defining the panels may be welded together after assembly, to reduce heat losses along the dividing lines between the various panels (FIG. 2).

Where pipes enter or different surfaces intersect, that is to say, where panels must end in curved or straight lines, the cells are cut and sheets of metal are provided to define the ends of the panels at these lines.

The panels are easily fixed to the cylindrical surfaces of the vessel. Panels with an axial width of 1.5 to 2 m will be prepared ready curved with their radius of curvature, using the same standard insulating sheets as are shown in FIG. 3. As FIGS. 1 and 3 clearly show, the metal insulating sheets can be slightly curved in the plane between the fixing holes, because of the central undulation. This undulation also enables the distance between the fixing holes to be varied slightly. Mounting of the panels on the pins provided on the liner 1 is possible due to clearance between the pins and the fixing holes in the insulating sheets.

The metal structure of the panels, clearly visible in FIG. 1, consists of pieces of thin sheeting 0.2 to 0.5 mm thick, made from corrosion-resistant steel or corrosion-resistant alloys such as "Inconel", or "Nimonic".

The various component pieces can be welded together by means of "points electriques" (electric points) or spot welds along the edges.

A first portion of the structure is formed of strips 4 (FIG. 1) arranged in zigzags at 45° to the vertical. If the panels cover a vertical surface, these strips define the cells horizontally. The strips are interconnected by small bridging members 5 welded onto the strips. Holes 5' are provided in the bridging members 5 so that they can be fixed to and centered on the pins 2. The insulating sheets 6 which, with the strips 4, complete the insulating cells, are housed one on top of the other in recesses 7 defined by the strips 4 and liner 1. They are identical and are constructed as shown in FIG. 3.

Each sheet which is of generally square form has an undulation 8 traversing it along one diagonal and two undulations 9 which are perpendicular to the undulation 8 and are interrupted. These undulations permit thermal expansion of the sheets and also increase their transverse rigidity. Bent edges 10 bear on the strips 4 of the panel and prevent or reduce convection of the gas between the various cells. Each sheet contains two holes 11 by means of which it is mounted on the pins 2. At the holes 11, therefore, each sheet is superimposed on the adjacent sheets.

The distance between the nesting sheets, that is, the depth of the insulating cells, is normally of the order of 4 to 6 mm. This distance is preserved by two small semi-circular spacers 12 provided on the insides of the sheets at the holes 11, and by the two edges 13 at each end of the undulation 8.

Allowing for a clearance or diverging angle at the edges of the undulations 8 and 9 and at the bent edges 10, the distance between the nesting sheets can if desired be reduced almost to contact.

Four slots 14, situated at the points of intersection between the undulation 8 and the undulations 9, permit deformation of the sheet and therefore rapid and accidental depressurization of the system, without permitting marked convection of the gas between the cells during normal operation. The slots 14 also serve to increase deformability of the sheets during thermal expansion. The last sheet 6 in each recess is spot-welded right round its raised edges to the edges of the strips 4, to improve the mechanical properties of the panels while preserving their deformability.

Figure 4:
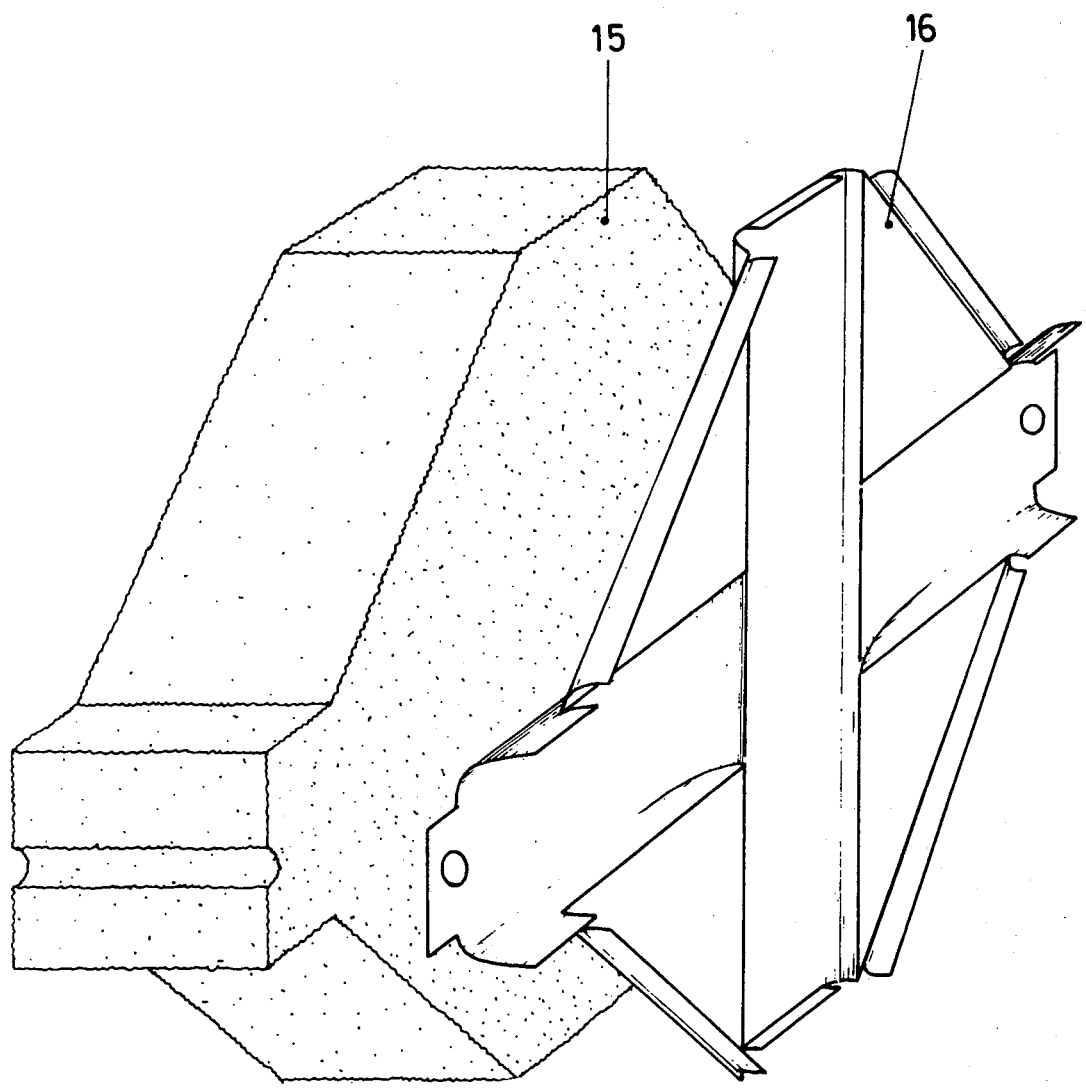
FIG. 4 illustrates the variant.

In a variant of the insulating panels described, the panel has the same basic metal structure, but the nesting sheets 6 are replaced by a fibrous or porous insulating element 15 (FIG. 4).

This element, which has the same shape as the recess which is to house it, may, for example, be in the form of a cushion of mineral fibres or of alternate thicknesses of metal sheeting and knitted or woven fabric, or it may be a single block of porous alumina enclosed at the edges in deformable metal knitted or woven fabric, to reduce heat losses along the edges of the recess.

A metal sheet 16 identical to the sheets 6 already described is placed above the insulating element 15 and is fixed to the edges of the strips 4 as described above. This sheet therefore completes the metal structure of the panel and encloses the insulating element in the recess of the cell.

Another variant of the system structure uses the strips 4 of the cells directly to connect the insulating system to the vessel liner 1. In this case pins 2 need not be used, and the strips 4 can be welded directly to the liner 1, by means of spot welds or a continuous seam, along the edge in contact. In this case the bridging members 5 are no longer required.

In another embodiment, the strips 4 may be connected to the liner 1 by means of the bridging members 5, which are spot-welded directly to the liner.

In both these cases, the pins 2 and the associated concentrated hot spots on the liner 1 can be avoided.

Also, if the strips 4 are welded directly to the liner 1, these strips and therefore the actual metal structure of the panels can be used to increase the rigidity of the liner. Since, in this last embodiment, the strips 4 have a more important structural function, they must be thicker than the strips in the preceding embodiments. Other things being equal, however, the liner 1 can be made thinner, so saving material.

We claim:

1. A panel for thermally insulating the interior of a vessel in a gas-cooled reactor comprising a series of metal strips, bent to define between these strips a series of cells; and thermally insulating material housed and fixed in said cells, the strips being mechanically attached to the vessel interior, and the strips and the thermally insulating material being constructed and interconnected to permit the thermal expansion of the panel at each cell.

2. A panel for thermally insulating the interior of a vessel in a gas-cooled reactor as claimed in claim 1, wherein the series of metal strips are mechanically interconnected by metal bridging members, at places where the distance between two strips is minimal, the bridging members containing holes for the passage of panel-fixing pins welded to the inside surface of the vessel.

3. A panel for thermally insulating the interior of a vessel in a gas-cooled reactor as claimed in claim 2 wherein characterised in that the pins are in the form of empty tubes.

4. A panel for thermally insulating the interior of a vessel in a gas-cooled reactor as claimed in claim 3, wherein the pins partly consist of thermally insulating material.

5. A panel for thermally insulating the interior of a vessel in a gas-cooled reactor as claimed in claim 1 wherein the thermally insulating material is in the form of metal sheets superimposed on one another, having the same shape as the cell in which they are housed, and comprising one undulation along a diagonal and at least two undulations which are perpendicular to the first undulation.

6. A panel for thermally insulating the interior of a vessel in a gas-cooled reactor as claimed in claim 1 wherein the thermally insulating material is a fibrous element formed by a cushion comprising alternate thicknesses of a woven fabric and sheet-metal.

7. A panel for thermally insulating the interior of a vessel in a gas-cooled reactor as claimed in claim 1 wherein the thermally insulating material is a porous block of alumina, defined at the edges with a deformable metal fabric.

8. A panel for thermally insulating the interior of a vessel in a gas-cooled reactor as claimed in claim 1 wherein the strips are welded to the vessel interior.

9. A vessel for use in a gas-cooled nuclear reactor having over a portion of the interior of the walls thereof a thermal insulating panel comprising a series of strips secured to the vessel walls with their width upstanding therefrom, said strips being shaped in a zigzag and opposed to one another to define, between pairs of adjacent strips, rows of recesses; and thermal insulating material contained in the recesses, said strips and insulating material being connected so as to permit thermal expansion of the panel at each cell.

10. A vessel as claimed in claim 9 in which the thermal insulating material comprises a stack of spaced apart sheets generally parallel to the vessel wall and generally conforming to the shape of the recesses within which they are contained.

11. A vessel as claimed in claim 10 in which the sheets are of generally square outline with projecting ears at the opposite ends of a diagonal, the ears lying between the troughs of the waves of the pair of adjacent strips and being secured to the vessel wall.

* * * * *